Sept. 26, 1933.  A. LYSHOLM  1,927,944
BLADE RING FOR RADIAL FLOW ELASTIC FLUID TURBINES
Filed May 31, 1930  4 Sheets-Sheet 1

INVENTOR
*Alf Lysholm*
BY
*his* ATTORNEY

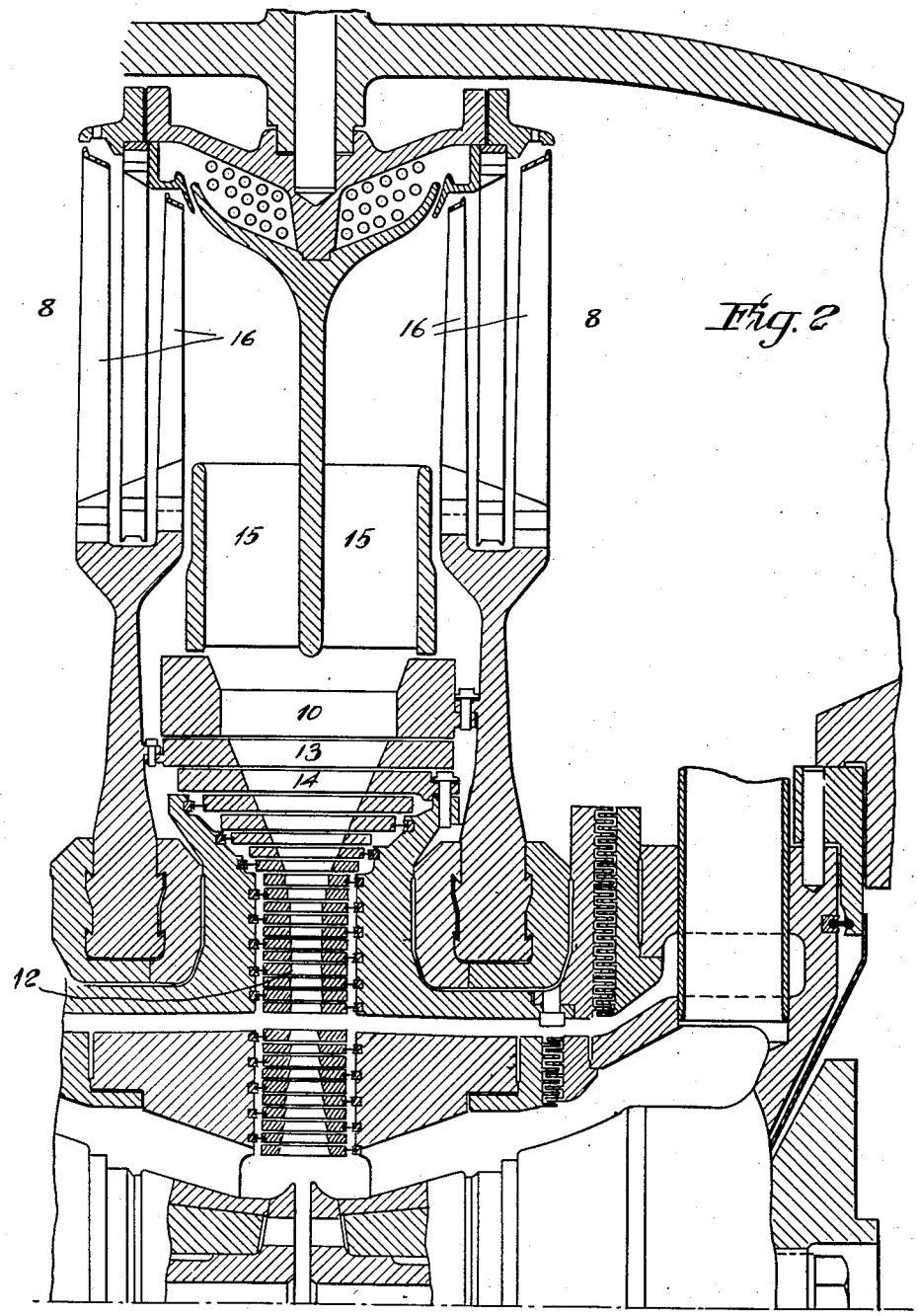

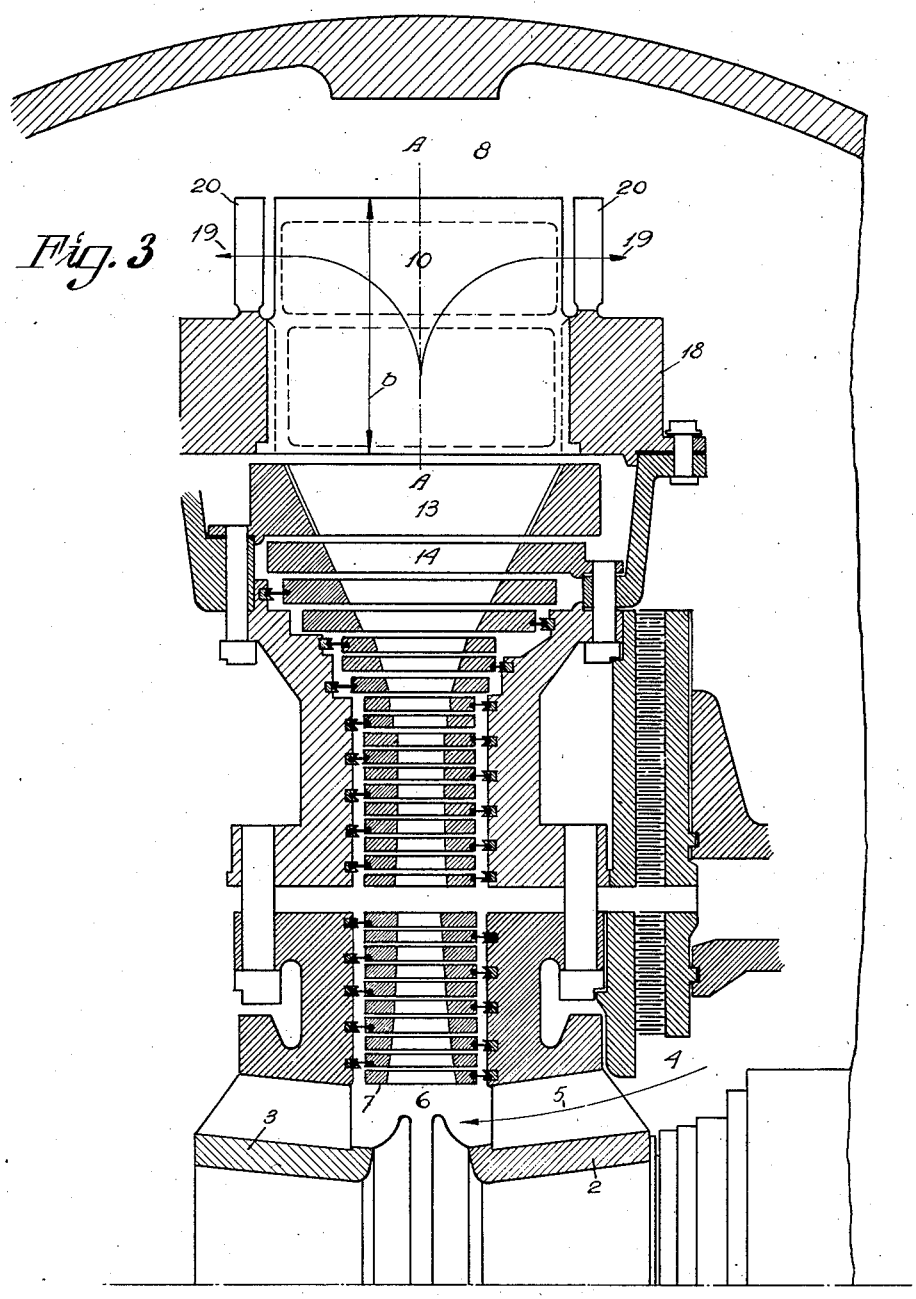

Sept. 26, 1933.  A. LYSHOLM  1,927,944
BLADE RING FOR RADIAL FLOW ELASTIC FLUID TURBINES
Filed May 31, 1930  4 Sheets-Sheet 4
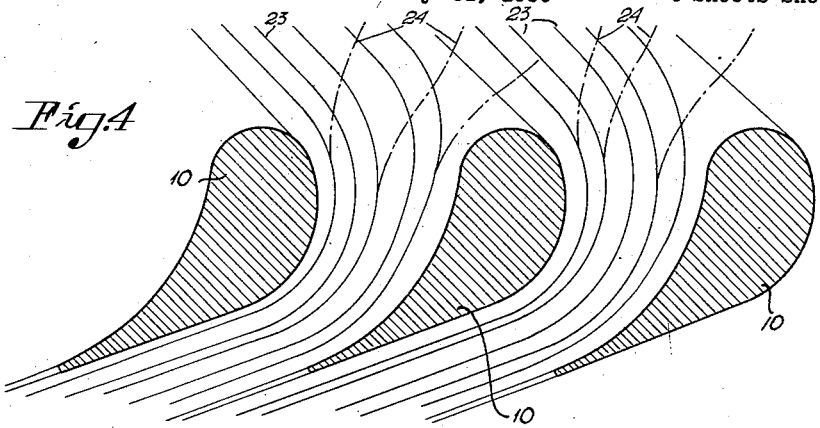
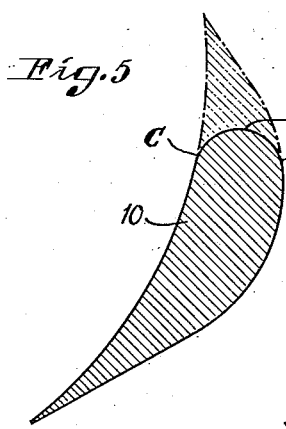
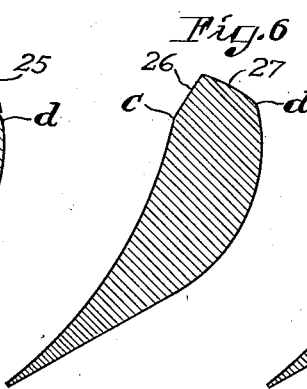
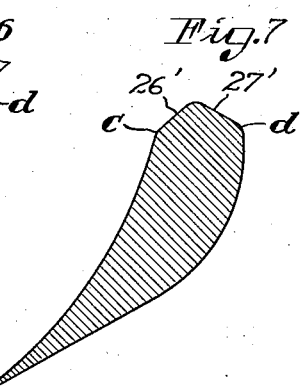
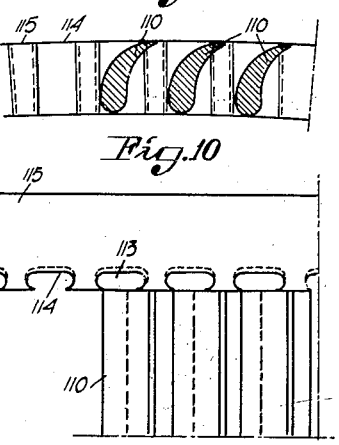
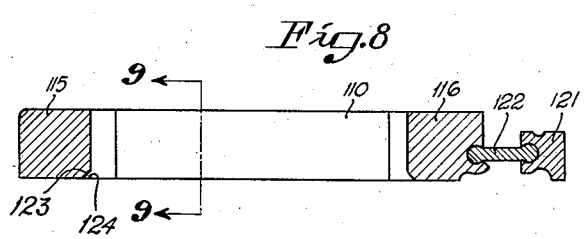
INVENTOR
Alf Lysholm
BY
his ATTORNEY Patented Sept. 26, 1933

1,927,944

UNITED STATES PATENT OFFICE 1,927,944

BLADE RING FOR RADIAL FLOW ELASTIC FLUID TURBINES

Alf Lysholm, Stockholm, Sweden, assignor to Aktiebolaget Ljungströms Ångturbin, Stockholm, Sweden, a joint - stock company of Sweden Application May 31, 1930, Serial No. 457,709, and in Sweden October 25, 1929

7 Claims. (Cl. 253—16.5)

This application is a continuation in part with respect to my co-pending application, Serial No. 402,193, filed October 24, 1929, and relates back thereto, as to common subject matter, for all dates and rights incident to the filing of said application, Serial No. 402,193, and foreign applications corresponding thereto.

Radial flow elastic fluid turbines have already been constructed having a plurality of radially spaced blade rings inserted between each other in telescoped relation, each blade ring consisting of two or more axially spaced ring bonds having blades fixed between them, between which blades the elastic fluid flows in substantially radial direction outwardly from the center of rotation of the turbine toward the space between the blade system and a housing surrounding the same or to the inlet of an axial flow blade system or a separate axial flow turbine. The area for the passage of the elastic fluid which is required by the expansion of such fluid must be increased from one blade ring to the next. If two blade rings of different diameters have blades of equal length the ring having the greater diameter will provide a greater area for flow of fluid than the blade ring having the lesser diameter, but in order to obtain the required increase in the area for flow of fluid through the blade rings which corresponds to the desired expansion of the fluid the blades in the different rings must be made of different lengths.

In prior forms of turbine construction of the character referred to the proper proportioning of the area for fluid flow through the turbine has in some instances required first a decrease and then an increase in the length of the turbine blades successively passed by the motive fluid. Because of the relatively large outlet area required the radially outermost blade rings have each heretofore generally comprised several axially spaced ring bonds between which have been secured several groups of blades. This construction has provided a plurality of axially side by side outlet channels for the fluid, and such subdivision of the flow area at this point in the turbine has been necessary because a single channel providing sufficient outlet area requires blades of such great length that they are extremely difficult to produce.

It is furthermore difficult to build turbines with such blade systems having the desired high efficiency.

It is well known that the efficiency of a turbine depends on the Parsons figure, that is to say $$\frac{\Sigma U^2}{H},$$

in which U is equal to the peripheral velocity of the blade rings and H is equal to the drop of heat through the turbine. It is further known that the efficiency of a turbine has a maximum value for a Parsons figure which somewhat exceeds 3,000. In order to obtain a high Parsons figure in double rotating turbines which may be combined with axial flow blade systems or other axial flow turbines, it therefore is necessary for the outermost blade ring to have a very large diameter, particularly if the given speed of rotation of the turbine is not increased. Of blades hitherto known and applied with blade fixing methods of the kind hitherto known, it has not been possible to produce requisitely large blade rings having sufficient strength without considerably increasing the cost of manufacture. Such a blade system has contained a large number of blade rings, that is, the developed length of the blade rings has been relatively great and thus involved the use of a large number of blades.

The present invention relates to radial flow elastic fluid turbines of the character described, which may or may not be combined with axial flow systems, and has for a general object the provision of a turbine having a high Parsons figure and consequently high efficiency, in which the developed length of the blading is materially reduced in comparison with that of turbines of comparable size using blading of usual dimensions and profile. Another general object is to provide a turbine of the character described having only a single channel for radial flow of motive fluid through the outer part of the radial flow blading and of a size such that with blading of the usual form as heretofore employed a plurality of axially side by side channels would be required in the outer portion of the radial flow blade system.

The above and other objects are accomplished in accordance with the invention by the provision of blades in the radially outermost blade ring of the radial flow blade system having a width in radial direction which is materially greater than the radial width of blades in the rings radially within the outermost ring, and by making the wider blades in the outermost ring of materially greater thickness at the inlet sides of the blades than at the outlet sides thereof, the thickened inlet sides of the blades being generally rounded off to provide a relatively blunt inlet surface. These wider blades are preferably formed so that the inlet surface is defined in cross section by a conic curve of circular, elliptical, parabolic or hyperbolic form and the radial width of such blades, pressed in millimeters, is equal to at least the quotient of 75,000 divided by the absolute speed of the blade ring in revolutions per minute.

In a double rotation type turbine there is of course obtained in the clearance space between the outermost blade ring and the next to the outermost blade ring, on account of the double rotation, a relative peripheral velocity which is approximately twice as great as the peripheral velocity of the outlet edges of the blades in the outermost blade ring. Due to this great difference between the relative peripheral velocity at the inlet of the outermost blade ring and the peripheral velocity at the outlet thereof, the blades in the last or outermost blade ring must be made with a considerably greater outlet angle than the blades in the next to the last blade ring have. In general this angle has been increased from 25–30° to 40–45°. On account of the great outlet angle of the last blades, blades having the usual normal blade profiles become very thin. If one investigates the stresses arising in such thin blades, one finds that said stresses become considerably greater than if the profile had been thicker. By providing the outer blades with rounded off blade edges the thickness of the blades can be considerably increased without increasing the blade friction. By this means the stresses on the blades are very materially reduced, thus rendering possible the use of single passages for large as well as small sizes of turbines.

The invention further consists in that both ends of blades and blade rings executed in the manner stated above are inserted in grooves arranged in the ring bonds and peripherally separated from each other, which grooves preferably extend through the material of the ring bonds in radial direction from the inner surfaces of the ring bonds to the outer surfaces thereof, these ring bonds being situated at an axial distance from each other, which, expressed in meters, is equal to or greater than 300 divided by the numerical value of the absolute normal number of revolutions per minute of the blade ring.

Further characteristic features of the invention will be described in the following and with reference to the accompanying drawings.

Fig. 2 shows a modification of the form of turbine shown in Fig. 1.

Fig. 3 shows still a further modification.

Fig. 4 shows a section through blades utilized in turbines shown in Figs. 1, 2 and 3.

Fig. 5 illustrates the difference in profile between a blade of known normal type and a blade constructed in accordance with the present invention.

Figs. 6 and 7 illustrate modified forms of blade profile in accordance with the present invention.

Fig. 8 shows a section through a blade ring.

Fig. 9 shows a section through a blade ring on line 9—9 in Fig. 8.

Fig. 10 is a plan view of part of the blade ring shown in Fig. 8.

Figure 1:
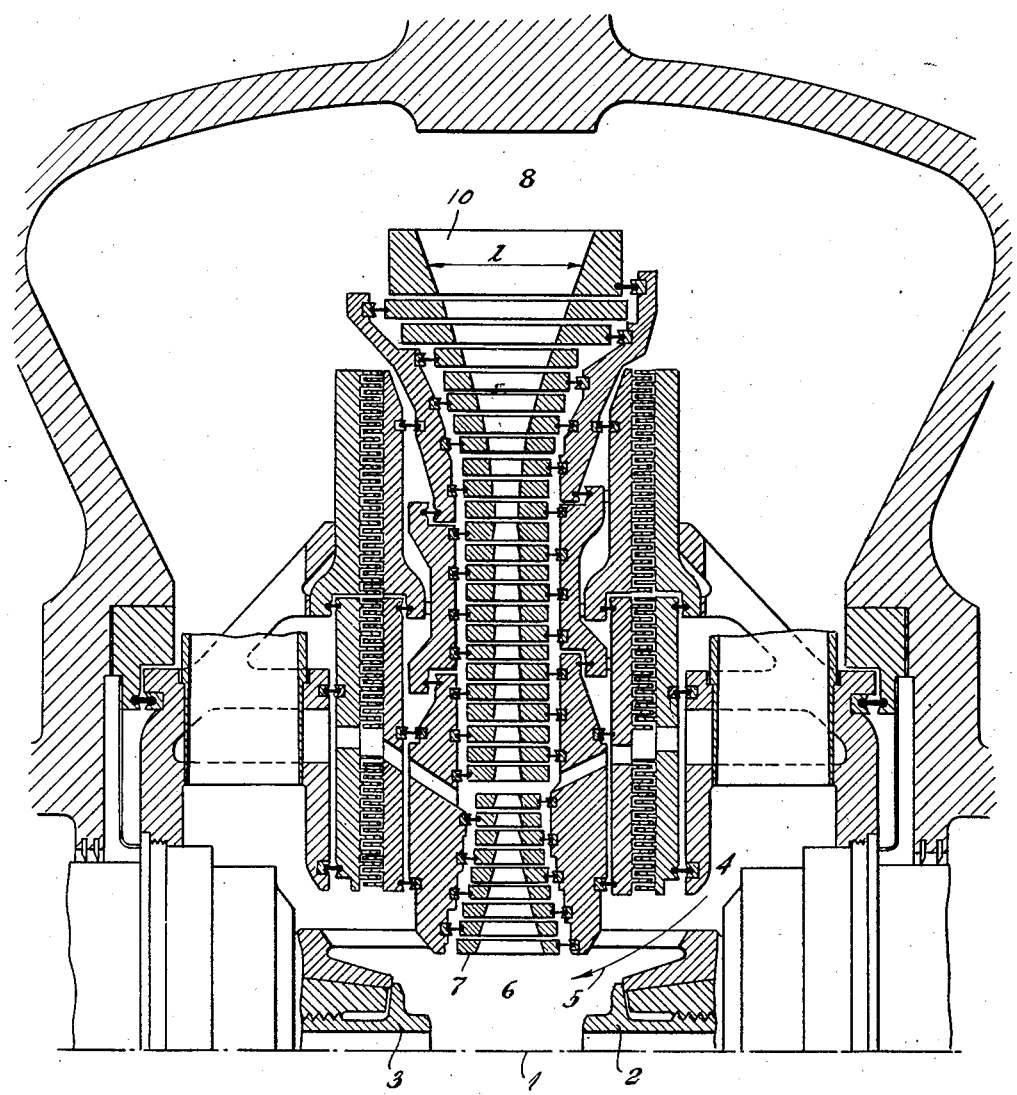
Fig. 1 shows a section through a portion of a turbine built in accordance with the principle of the invention.

Referring to Fig. 1, 1 is the center line of the turbine shaft, and 2 and 3 are two turbine shafts rotating in opposite directions each of which supports a turbine disk carrying a plurality of blade rings. The steam enters the center of the turbine through the channel 4 in the direction of the arrow 5 and flows, in delivering energy, from the central space 6 through the first blade ring 7 and thereafter through all the blade rings in radial direction and finally to the outlet 8. Of the blades, about one half of the total number rotate in one direction and the others rotate in the opposite direction, driving the rotary shafts 2 and 3. According to the principle of the invention, each of the blades 10 in the radially outermost blade ring 10 is provided with a blunt or rounded off inlet edge, in the manner as will be described later on with reference to Fig. 4, and having a considerably greater width than hitherto has been the case. By this means is gained the advantage, that the axial length 1 of the passage area of the outermost blade ring need only constitute one blade length. This is rendered possible in addition to the suitable profile of the blade also in that a wider blade displaces the discharge area for the steam to a greater radial distance from the center of the turbine shaft. The blade rings, therefore, will obtain a greater peripheral velocity, whereby the numerator of the term $$\frac{\Sigma U^2}{H}$$

denoting the Parsons figure is increased and possibilities are given to obtain a turbine having a better efficiency. Each of the outermost blades 10 has a width which is considerably greater than, for instance, the blades 13 in the next outermost blade ring and also than the blades 14 in the blade ring situated on the inside of the latter, which last-named blades also are considerably broader than the blades situated nearer the center of the turbine, for instance the blades 12 in Fig. 2. This construction provides a material improvement because of the fact that a number of these blade rings, particularly the outermost rings, which would otherwise each comprise a plurality of groups of blades situated axially side by side, each comprises but a single group of blades. It will be apparent that the substitution of a single group of blades per blade ring for a number of groups of blades per blade ring will result in a very material decrease in the total developed length of the blade rings. In addition is gained, that the total number of blade rings in the whole turbine can be less, because the wider blades in the outer blade ring form a substitution for several blade rings of older types. Having an increased value of the term $$\frac{\Sigma U^2}{H},$$

it thus is not necessary to increase the number of blade rings in the turbine, and therefore the cost of manufacture of the turbine will be reduced. If the turbine is to be built for a great power capacity, the steam is discharged, as indicated in Fig. 2 in which the same reference numerals are used for corresponding parts as in Fig. 1, upon having passed the last blades 10, through the guide blade system 15 to an axial flow turbine or an axial flow blade system 16 and finally out of the outlet 8.

According to Fig. 3 in which the same reference numerals have been employed for corresponding parts as in Figs. 1 and 2, the steam passes in known manner through the blade system from the blades 7 to the blades 10. In this embodiment the blades 10 have a width or radial extension $b$ which is considerably greater than the width of the blades situated nearer the center of the turbine, and are further of considerably greater width than the ring bond, into which said blades are fixedly inserted. When the steam has passed through the ring bond 18, it can flow towards the outlet 8 through a passage in axial direction, as indicated by the arrows 19. At those places on the ring bond 18, at which such passage essentially will take place, a plurality of radially disposed blades 20 may be arranged for a better diversion of the steam.

Fig. 4 shows diagrammatically cross or profile sections of blades utilized in a turbine according to Figs. 1, 2 and 3, and particularly of blades 10 in the outermost blade ring. These last-named blades have, according to the principle of the invention, a rounded-off inlet edge and a greater thickness at the inlet side than at the outlet side. By this means is gained that the entering steam which at normal load has a direction, as indicated by the lines 23, may receive a direction which considerably varies from said indicated path 23, for instance, in the directions, as indicated by the dash-dotted lines 24, without thereby producing eddies or the like behind or in front of the blades, seen in the direction of rotation of the blades, which eddies reduce the efficiency of the turbine.

Referring to Fig. 5 there is illustrated the manner in which the blades, particularly the blades 10, are formed in accordance with the principle of the present invention. This may best be illustrated by first considering the portion of the figure shown in full lines together with the portion shown in dot-and-dash lines, these portions together forming a blade of what may be termed normal profile. If now the portion of the blade represented by dot-and-dash lines is removed it will be evident that the absolute value of the pitch in the blade ring will not be altered, but the value of the pitch relative to the width of the blade will be increased. This, however, will not operate to decrease the efficiency of the blades, for the portion shown in dot-and-dash lines which is removed is of little effective value during operation of the turbine. By this means it is possible to reduce the number of blades per blade ring and thus reduce the total number of blades in the turbine.

In order, however, to produce a turbine having still further blades and an increased diameter for the outermost blade ring and thus also an augmentation of the term $\Sigma U^2$, the width of the blade preferably is increased in such a manner, that the width agrees with or surpasses that width which a blade having a pointed inlet edge has. The blade shown in Fig. 5, therefore, with this object in view and having a rounded-off edge, as indicated by the dotted lines in this figure. will be enlarged in its entirety, so that the same blade width hitherto used is again obtained or surpassed, whereby also the pitch becomes greater, absolutely and relatively, than hitherto has been the case. Previously, the pitch in turbines of the last-named type has been at the most 0.7 to 0.8 times the width of the blade, that is, the dimension of the blade reckoned in the direction of the flow of steam, but can now be made to be equal to or to lie between 0.9 and 1.4 times the blade width. According to the principle of the invention, the greatness of this pitch may preferably be related to the width of the blades as $$k : \sqrt{\sin \alpha} ,$$

where $k$ is equal to or greater than 0.5 and $\alpha$ is the outlet angle of the elastic fluid discharged from the blade ring.

As will be apparent from Fig. 5, the changing of the blade from normal profile to the profile in accordance with the invention results in the provision of a blade having instead of the usual pointed inlet edge a blunt or rounded off inlet surface 25, which may be said to extend in generally peripheral direction, and which merges at points $c$ and $d$ with the front and rear surfaces of the blade. Considered in another manner, it may be said that the blade profile of the present invention is secured by removing the material lying between the front and rear surfaces of a blade of normal profile at the inlet side thereof. It will be evident that the exact contour of the inlet surfaces 25 may be varied, and in Fig. 6 is shown a modification of blade profile in which the inlet surface, which in each case is considered as extending from $c$ to $d$, comprises substantially plane surfaces 26 and 27.

Fig. 7 illustrates another modification of blade profile similar to Fig. 6.

The principal characteristic of the inlet surface as carried out in accordance with the present invention is that it is relatively blunt, and from the several modifications of blade profile illustrated it will be evident that such a blunt inlet surface may be obtained either by the use of some form of conic surface the nature of which is such that lines tangent thereto at different points intersect at an obtuse angle, or by use of substantially plane surfaces (as shown in Figs. 6 and 7), which converge so as to intersect at an obtuse angle.

Referring to Fig. 8, 110 designates a blade, for instance a blade 10 in the outermost blade ring in the radial flow blade system, which blade is united at each end with the ring bonds 115 and 116 respectively. 121 designates a portion of the turbine disk and 122 an articulated connection which unites the ring bond 116 with the turbine disk 121.

In Fig. 9 there is again to be seen the ring bond 115, a number of blades 110 being fixedly inserted in grooves 114 which preferably extend from the inner surface of the ring bond 115 to the outer surface of same, while a number of grooves are shown without any such blades. These grooves 114 are, as indicated, in Fig. 10 of such form with respect to the ends 113 of the blades, that the latter cannot be released from the ring bond by a movement in the longitudinal direction of the blades. They can, however, be moved relatively to the ring bonds parallel with themselves, that is to say in radial direction, or to put it in another way, longitudinally of the axes of the grooves, in case the blades are subjected to a force which is sufficiently great to overcome the friction between the blade ends and the walls of the grooves. In order to increase this friction, that is to say the pressure between the blade ends and the walls of the grooves, the ends should, upon having been inserted into the grooves, be subjected to a clenching or riveting operation in such a manner, that they entirely or almost entirely will fill up the grooves and thus be forcibly pressed against the walls of the grooves. This clenching operation should be effected under such high pressure that the yielding point of the material of which the blade ends are manufactured, is exceeded so that, when said ring bond 115 during its rotation is stretched by the centrifugal force and thereby the grooves are increased as to their size, the blade ends by the action of expansion of the material also are increased as to their size, and still with sufficient pressure against the walls of the grooves will fill up these grooves. In order to further secure this fastening-in, so that the blade ends cannot be released from the ring bond by movement in longitudinal extension of the grooves, the ring bonds may be provided with chamfered edges 123, over which edges 124 of the blade ends are forced by a riveting process or the like. Various other forms of groove fastening means may be employed, all of such means being designed to prevent the blades from being thrown radially from the ring bonds due to the action of centrifugal force. Preferably the blades 10 in the outermost blade rings are fastened in the above stated manner in the ring bonds, whereby is rendered possible, that the blade fastenings correspond to those stresses, which will be a result of the blades being increased as to their length, according to the principle of the invention, and situated at a greater distance from the center of the turbine. Especially in connection with the fastening of the blades in the manner above described, it is rendered possible to obtain blades of such length, that the outlet area for the radially outermost blade ring, expressed in square meters, may, according to the principle of the invention, be made equal to or greater than $$0.4\left(\frac{3000}{n}\right)^2,$$

in which $n$ represents the numerical value of the number of revolutions per minute, by this means that the requisite axial extension of the outlet area, that is the distance between the ring bonds, expressed in millimeters, may be made equal to or greater than 300,000 divided by the numerical value of the absolute normal number of revolutions per minute of the blade.

By using constructions, according to the principle of the invention, in which the outermost blade ring contains considerably broader blades than hitherto has been the case, which blades also have a greater width than blades in blade rings situated nearer the center, it has been possible partly to considerably increase the greatest diameter of the blade system, that is to say to position the outlet from the blade system at a greater radius, at the same time rendering possible a single through-passage through the last blade ring and thus also through the blade rings situated nearer the latter, and partly to increase the Parsons figure and thus the efficiency of the whole turbine system. This has been made possible without increasing the number of blades in the turbine, because on one hand, each blade ring contains a less number of blades on account of the greater pitch, and on the other hand, all blade rings are constructed for single through-passage of the steam or gas, that is to say no blade rings contain several ring bonds and blade groups arranged side by side. As a consequence thereof, it has been possible to reduce the total developed length of the blade rings to about one half of the usual developed length of the blade rings in normal turbine sizes, at the same time as the Parsons figure has been increased from about 2000 to about 3000. Because of the reduction in the total developed length of the blade rings the blade system, in accordance with the present invention, can be manufactured without increasing the cost and at even a lower cost than the cost of turbines of the same power having lower Parsons figures.

A turbine provided with blades according to the principle of the invention further receives an increased torsional moment at the starting instant and may therefore be utilized, for instance, as motor for driving a locomotive, whereby the starting capability of the locomotive and its capability of running up on inclines will be considerably augmented.

A blade system according to the present invention also renders possible the building of large turbine types at lower costs than hitherto has been the case and in many cases without the necessity to employ a special axial flow blade system. The limit for the necessity to combine the radial flow blade system with an axial flow blade system has been increased from 3000 kw. normal load to 10,000 kw. normal load or from 4300 kw. maximum constant load to 14,000 kw. maximum constant load.

It will be evident to those skilled in the art that the examples herein shown by way of illustration are subject to modification within the scope of the invention.

What I claim is:—

1. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades secured between said ring bonds, the radially outermost blade ring comprising blades having greater width in radial direction than the width of blades in blade rings radially within the outermost blade ring and having maximum blade thickness nearer to the inlet side of the blade row than to the outlet side thereof, the blade profile providing blunt inlet surface the peripheral extent of which is equal to a substantial part of the maximum thickness of the blade, the size of said turbine and the normal speed of operation thereof being such that to obtain the necessary outlet area for flow of motive fluid from said outermost blade ring requires an axial dimension of the passage for motive fluid through said outermost blade ring which is greater than can be provided practically with a single row of blades of usual profile and radial width in said outermost blade ring.

2. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades having end portions seated directly in grooves formed in the confronting side faces of the ring bonds, the radially outermost blade ring comprising blades having greater width in radial direction than the width of blades in blade rings radially within the outermost blade ring and having maximum blade thickness nearer to the inlet side of the blade row than to the outlet side thereof, the blade profile providing blunt inlet surface the peripheral extent of which is equal to a substantial part of the maximum thickness of the blade, the size of said turbine and the normal speed of operation thereof being such that to obtain the necessary outlet area for flow of motive fluid from said outermost blade ring requires an axial dimension of the passage for motive fluid through said outermost blade ring which is greater than can be provided practically with a single row of blades of usual profile and radial width in said outermost blade ring.

3. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades secured between said ring bonds, the radially outermost blade ring comprising blades having greater width in radial direction than the width of blades in blade rings radially within the outermost blade ring and having maximum blade thickness nearer to the inlet side of the blade row than to the outlet side thereof, the blade profile providing blunt inlet surface the peripheral extent of which is equal to a substantial part of the maximum thickness of the blade, the size of said turbine and the normal speed of operation thereof being such that to obtain the necessary outlet area for flow of motive fluid from the turbine requires an outlet area expressed in square meters, for flow of motive fluid from said outermost blade ring of at least $$0.4 \times \left(\frac{3000}{n}\right)^2,$$

where $n$ is the normal speed of operation of the turbine in revolutions per minute, said outlet area for flow of motive fluid from the outermost blade ring being greater than can be provided practically with a single row of blades of usual profile and radial width in said outermost blade ring.

4. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades secured between said ring bonds, the radially outermost blade ring comprising blades having a width in millimeters in radial direction equal to at least $$\frac{75000}{n},$$

where $n$ is the absolute revolutions per minute of said outermost blade ring at normal turbine speed, and having a profile providing blunt inlet surface the peripheral extent of which is equal to a substantial part of the maximum thickness of the blade, the size of said turbine and the normal speed of operation thereof being such that to obtain the necessary outlet area for flow of motive fluid from said outermost blade ring requires an axial dimension of the passage for motive fluid through said outermost blade ring which is greater than can be provided practically with a single row of blades in said outermost blade ring of usual profile and of usual axial width with respect to turbine speed.

5. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades having end portions seated directly in grooves formed in the confronting side faces of the ring bonds, the radially outermost blade ring comprising blades having greater width in radial direction than the width of blades in blade rings radially within the outermost blade ring and having maximum blade thickness nearer to the inlet side of the blade row than to the outlet side thereof, the blade profile providing blunt inlet surface the peripheral extent of which is equal to a substantial part of the maximum thickness of the blade, the size of said turbine and the normal speed of operation thereof being such that to obtain the necessary outlet area for flow of motive fluid from said outermost blade ring requires an axial dimension in millimeters of the passage for motive fluid through said outermost blade ring of at least $$\frac{300000}{n},$$

where $n$ is the absolute revolutions per minute of the blade ring, said outlet area for flow of motive fluid from the outermost blade ring being greater than can be provided practically with a single row of blades of usual profile and radial width in said outermost blade ring.

6. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades secured between the ring bonds, the radially outermost blade ring comprising blades having considerably greater width in radial direction than the width of blades in blade rings radially within the outermost blade ring and having a maximum blade thickness nearer to the inlet side of the blade row than to the outletside thereof, the blade profile providing blunt inlet surface the peripheral extent of which is equal to a substantial part of the maximum thickness of the blade, and the width of the blades in the outermost ring being such that the single row of blades in the outermost ring are effective to give a Parsons figure for the turbine which would require a plurality of additional blade rings if blades of usual profile and radial width were employed in the outermost blade ring of the turbine.

7. An elastic fluid turbine comprising a radial flow blade system having a plurality of blade rings providing a single path for flow of motive fluid radially through the outer portion of said system, each of the blade rings in said outer portion of the blade system comprising axially spaced ring bonds and a single row of blades having end portions seated directly in grooves formed in the confronting side faces of the ring bonds, the radially outermost blade ring comprising blades having considerably greater width in radial direction than the width of blades in blade rings radially within the outermost blade ring and having a maximum blade thickness nearer to the inlet side of the blade row than to the outlet side thereof, the blade profile providing blunt inlet surface the peripheral extent of which is equal to a substantial part of the maximum thickness of the blade, and the width of the blades in the outermost ring being such that the single row of blades in the outermost ring are effective to give a Parsons figure for the turbine which would require a plurality of additional blade rings if blades of usual profile and radial width were employed in the outermost blade ring of the turbine.

ALF LYSHOLM.